Oct. 25, 1960  R. E. WADE  2,957,571
SPREADER AND FEEDER FOR TRAVELING BALER
Original Filed May 8, 1957
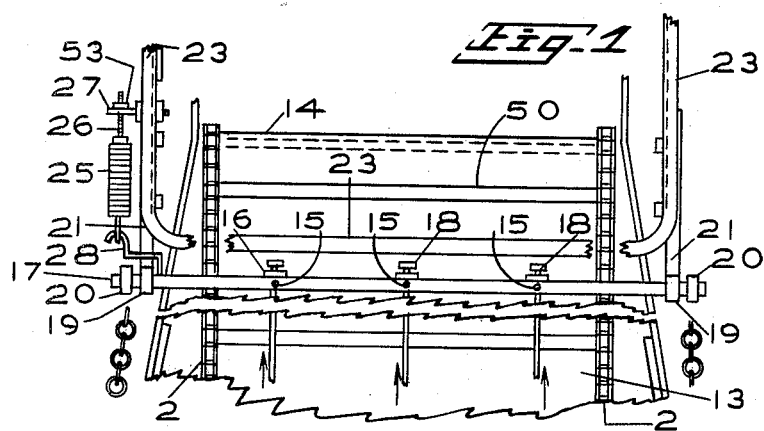
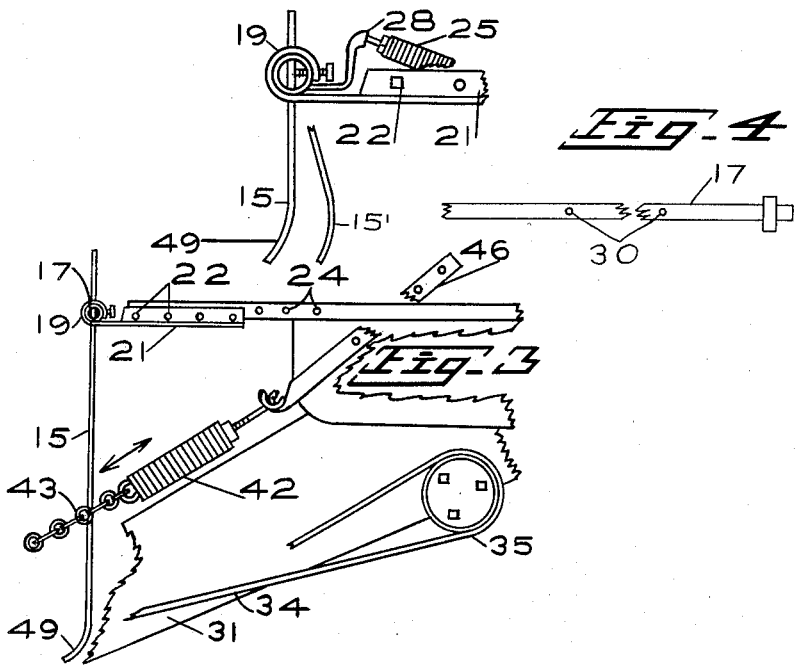
INVENTOR.
Robert Edgar Wade
Per L. L. Mitchell
Attorney

United States Patent Office 2,957,571
Patented Oct. 25, 1960

2,957,571

SPREADER AND FEEDER FOR TRAVELING BALER

Robert Edgar Wade, Consort, Alberta, Canada, assignor of one-half to William Cecil Wade, Consort, Alberta, Canada Original application May 8, 1957, Ser. No. 657,805, now Patent No. 2,896,391, dated July 28, 1959. Divided and this application Feb. 2, 1959, Ser. No. 790,580

1 Claim. (Cl. 198—160)

This invention relates to an attachment for traveling balers by which hay or straw carried by a conveyer to a bale forming unit may be spread on the conveyor and fed to the bale forming unit in a layer of uniform depth. The present disclosure is a divisional application in respect to matter disclosed in an application filed under date of May 8, 1957, Serial Number 657,805, now Patent No. 2,896,391.

In traveling balers of a character for which the present attachment is concerned a conveyor is employed to elevate and deliver hay or straw to a bale forming unit where the hay or straw is rolled and then wound with twine and discharged. During the period of winding and discharging the bale the conveyor must be stopped, and during continued forward progress of the baler a quantity of the material accumulates on the conveyor.

The present invention is concerned with the spreading and feeding of this material to the bale forming unit following an accumulation on the conveyor, and also during progress of the conveyor at all times, particularly while working with a heavy growth of hay or straw.

In the drawings, which illustrate a preferred embodiment of the invention,

Fig. 1 is a plan view of a section of a conveyor unit in a traveling baler of a character for which the attachment is designed, the conveyor unit section being shown broken away in part and including the improved spreader attachment.

Fig. 2 is a detail enlarged side view of the spreader attachment taken by itself, shown broken away in part.

Fig. 3 is a side view of the attachment shown in relation to the baler conveyor, the latter being shown broken away and the attachment shown with the spring omitted.

Fig. 4 is a top view of the pipe for suspension of the hooked rods, shown broken away in part.

Having reference to the drawings, at 13 is indicated a conveyer, as in common use for elevating material in a traveling baler of a type for which the present attachment is designed, the conveyer including a canvas 14, chains 2 and raddle slats 50 at intervals. There is also indicated a side plate 31 forming part of the conveyer structure, of which 34 is a belt for driving the conveyer by a pulley 35. Further, at 42 is indicated a spring by which a cushion support is provided for the conveyer, at 43 a chain by which the spring may be connected to the lower end of the conveyer, and at 46 a bracket bar attachable to a frame member in the conveyer. All of the foregoing forms a part of the baler structure as set out in the previous filed application and indicated by the corresponding reference numerals.

The improved spreader and feeder attachment is made up of a series of rods 15 suspended from a tubular pipe 17 that provides openings 30 in which the rods are vertically slidably secured by set screws 18 threaded in plates 16 fixed to the pipe 17, the pipe providing suitable openings for the set screws to penetrate and engage the rods. By this means the rods are separately adjustable in the pipe 17.

The pipe 17 is carried by brackets 21, the brackets including looped ends 19 in which the pipe is mounted to turn. At the pipe ends are collars 20 securing it against endwise displacement. The brackets 21 are attached by bolts 22 on a U-shaped arm 23 carried mounted to the baler frame structure in any suitable manner.

By this means the rods 15 may be carried suspended above the conveyer an amount corresponding to the desirable depth of material to be fed to the bale forming unit. The backward movement of the rods requires to be limited and for this a spring 25 is provided at one end of which is a threaded rod 26 slidable in a bracket 27 fixed to the arm 23. The end of the rod 26 is threaded for engagement of a nut 53 by which the rod is secured and permitting adjustment of the tension of the spring 25. The other end of the spring engages a hook 28 fixed to the pipe 17 by which turning of the pipe counterclockwise, as when the rods 15 are moved by oncoming material on the conveyer, as indicated by the position of the rods at 15′, serves to turn the hook 28 on the pipe 17 through an arc that moves the end of the hook engaging the spring 25 away from the bracket 27, serving to tension the spring and this in turn moves the hook back to restore the pipe 17 to its normal position with the rods 15 depending vertically above the conveyer when the pressure of material against the rods 15 has been removed.

In the use of the attachment, during the period required for winding the bale with twine in the bale forming unit and discharging the bale the conveyer must be stopped, and if the baler continues its forward progress a quantity of material accumulates on the conveyer. When the conveyer starts again this material must be fed evenly to the bale forming unit along with new material being gathered.

The rods 15 are spaced above the conveyer an amount that permits a suitable layer of material to be carried to the bale forming unit and these rods during travel of the conveyer ensure this, particularly when handling a heavy cutting of hay or straw.

Additionally the rods serve to hold the upper part of the accumulation of material on the conveyer after it has been stopped while a bale is wound and discharged. The hooked ends of the rods engage the upper part of the material accumulation, limiting the feeding of the material past the rods to the proper depth, and it might be noted that this material is not packed as it goes past the rods, but feeds in an even loose depth as required for a uniformly wound bale, there being no downward pressure of the rods on the material.

Having thus particularly described and ascertained the nature of my said invention, what I claim and wish to secure by Letters Patent is:

An attachment for regulating the depth of loose material passing over an inclined conveyer, said attachment comprising a pipe, arms by which the pipe may be carried supported above and transversely of the conveyer, a series of rods endwise adjustable in the pipe vertically suspended, said rods having their lower end portions curved and adapted for hooked engagement with the loose material, and spring means engaging the pipe and adapted to be tensioned by turning of the pipe axially.

References Cited in the file of this patent

UNITED STATES PATENTS

| | | |
|---|---|---|
| 902,391 | Footitt | Oct. 27, 1908 |
| 963,270 | Blakley | July 5, 1910 |
| 2,378,107 | Russell | June 12, 1945 |
| 2,490,143 | Magee | Dec. 6, 1949 |
| 2,839,981 | Harstick et al. | June 24, 1958 |